(12) United States Patent  
Razavi

(10) Patent No.: US 7,835,038 B2
(45) Date of Patent: Nov. 16, 2010

(54) ILLUMINATION SOURCE COMPRISING MORE LIGHT EMITTING DIODES THAN TERMINALS

(75) Inventor: Hosein Ali Razavi, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1280 days.

(21) Appl. No.: 11/264,224

(22) Filed: Oct. 31, 2005

(65) Prior Publication Data

US 2007/0097463 A1 May 3, 2007

(51) Int. Cl.
 *H04N 1/46* (2006.01)
(52) U.S. Cl. ........................ 358/475; 362/227; 362/231
(58) Field of Classification Search ................. 358/475; 362/227, 231
See application file for complete search history.

(56) References Cited

U.S. PATENT DOCUMENTS

| | | | |
|---|---|---|---|
| 5,499,112 A | 3/1996 | Kawai et al. | |
| 5,753,906 A | 5/1998 | Gennetten | |
| 5,808,295 A | 9/1998 | Takeda et al. | |
| 5,808,592 A * | 9/1998 | Mizutani et al. | 345/83 |
| 5,818,033 A | 10/1998 | Takeda et al. | |
| 5,905,583 A | 5/1999 | Kawai et al. | |
| 5,959,740 A | 9/1999 | Takeda et al. | |
| 6,299,329 B1 * | 10/2001 | Mui et al. | 362/227 |
| 6,333,779 B1 | 12/2001 | Tabata et al. | |
| 6,346,997 B1 | 2/2002 | Takeda et al. | |
| 6,357,903 B1 | 3/2002 | Furusawa et al. | |
| 6,375,335 B1 | 4/2002 | Tabata et al. | |
| 6,426,807 B1 | 7/2002 | Kawai et al. | |
| 6,473,154 B2 | 10/2002 | Tabata et al. | |
| 6,512,600 B1 | 1/2003 | Kawai et al. | |
| 6,661,497 B2 | 12/2003 | Tabata et al. | |
| 6,786,626 B2 | 9/2004 | Wu et al. | |
| 6,851,816 B2 | 2/2005 | Wu et al. | |
| 6,900,448 B1 | 5/2005 | Thompson | |
| 2001/0026369 A1 * | 10/2001 | Yamaguchi | 358/1.1 |
| 2001/0046136 A1 * | 11/2001 | Weber et al. | 362/494 |
| 2001/0046331 A1 | 11/2001 | Altunbasak et al. | |
| 2003/0076551 A1 | 4/2003 | Kawai et al. | |
| 2003/0218671 A1 * | 11/2003 | Nagafusa et al. | 347/246 |

* cited by examiner

*Primary Examiner*—Benny Q Tieu
*Assistant Examiner*—Qian Yang

(57) ABSTRACT

An illumination source for a scanner comprises a plurality of terminals and a plurality of light emitting diodes (LEDs) with at least two LEDs having different wavelengths. Each LED is coupled to a terminal and each LED is capable of being turned on and off via a signal provided to a terminal to which that LED is coupled. The number of LEDs is greater than the number of terminals.

17 Claims, 16 Drawing Sheets

ILLUMINATION SOURCE COMPRISING MORE LIGHT EMITTING DIODES THAN TERMINALS

BACKGROUND

Most, if not all, scanners include an illumination source whose light reflects off of or through the object to be scanned and into a detector. All else being equal, a higher quality scanned image is desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

The term "concurrent" or "currently" refers to multiple events happening at the same time, but not necessarily starting and stopping simultaneously. As long as at least portions of the multiple events are occurring at the same time (i.e., the events overlap in time), the events are considered to be concurrent. Further, the term "illuminate" includes the generation of light in the visible portion of the electromagnetic spectrum as well as light outside the visible portion of the spectrum.

DETAILED DESCRIPTION

The type of illumination source for a scanner may vary from scanner to scanner. One type of illumination source includes a light emitting diode (LED) of a particular wavelength (i.e., color). LED-based illumination sources for color scanners, however, often result in an image quality that may be less than desirable. The embodiments of the invention described herein provide an LED-based illumination source that creates a higher quality scanned color image.

Figure 1:
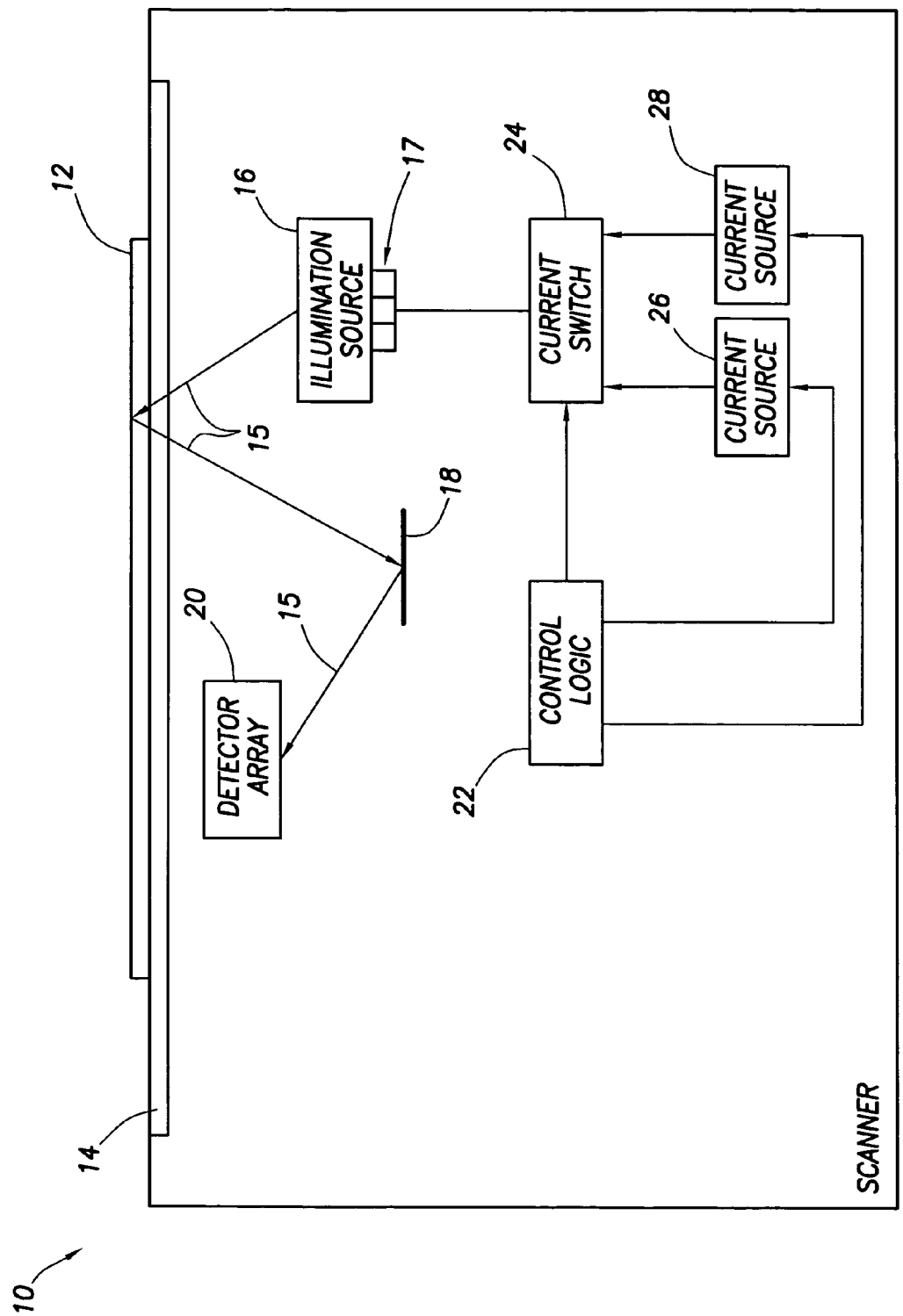
FIG. 1 shows a scanner in which embodiments of the invention may be used to advantage.

FIG. 1 illustrates a scanner system 10 in accordance with an embodiment of the invention. The scanner system 10 comprises a transparent platen 14 made from, for example, glass through which light (denoted by arrow 15) emitted by an illumination source 16 passes. The light 15 reflects from an object (e.g., a page) 12 to be scanned, back through the platen 14, off of a reflector 18, and into a detector array 20. In other embodiments, a diffractive, refractive or gradient index optical element can be used instead of or in addition to a reflector. A combination of more than one reflector 18 or diffractive, refractive or gradient index optical element can be provided as desired. In one embodiment, the page remains stationary and the light source 16 moves relative to the page to scan the entire page. In other embodiments, the light source 16 remains stationary and the page 12 and platen 14 moves.

FIG. 1 shows the light 15 reflecting off the object 12 to be scanned. In other embodiments of the scanner system 10, the light 15 is transmitted through the object being scanned, off or through one or more of a reflective, diffractive, refractive or gradient index optical element and into the detector array 20. In such embodiments, the illumination source 16 and detector array 20 are provided on opposite sides of the object being scanned.

The scanner 10 of FIG. 1 and other embodiments also comprises control logic 22 coupled to a current switch 24 and one or more current sources 26 and 28. Electrical current from one or both of the current sources 26, 28 is provided through the current switch 24 to the illumination source 16. The control logic controls the current waveforms generated by the current sources 26, 28, and causes the current switch 24 to provide the current to one or more terminals (e.g., pins) 17 of the illumination source 16.

Figure 2:
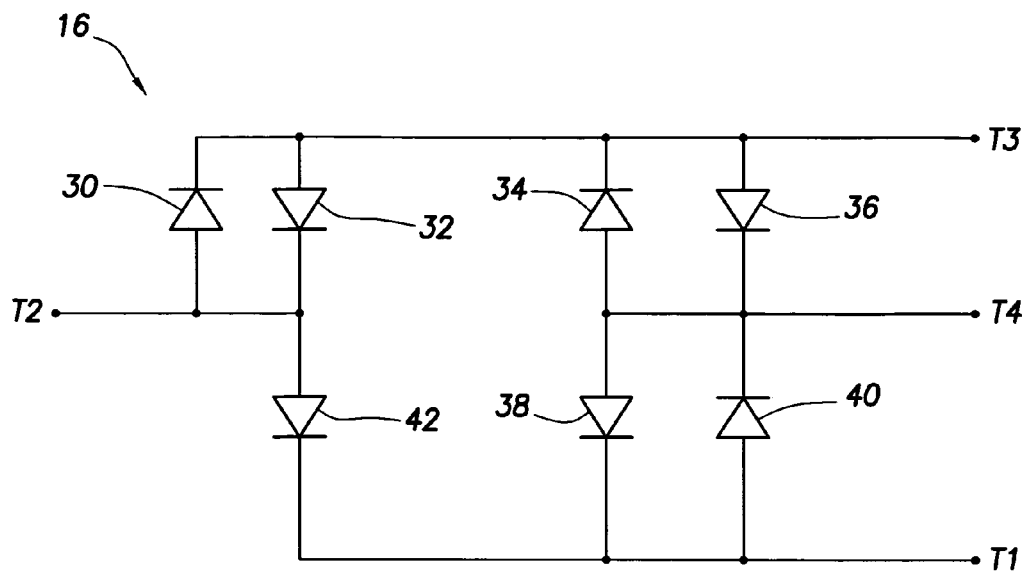
FIG. 2 shows an illumination source usable in a scanner in accordance with embodiments of the invention.

FIG. 2 shows an exemplary embodiment of illumination source 16. As shown in FIG. 2, the illumination source 16 comprises a plurality of LEDs 3042 and a plurality of pins (T1-T4). The illumination source comprises a plurality of LEDs such as three or more LEDs, four or more LEDs, five or more, six or more LEDs, and seven or more LEDs. In accordance with embodiments of the invention, the illumination 16 source comprises more LEDs than terminals. In the particular embodiment of FIG. 2, seven LEDs 30-42 are provided and four terminals T1-T4 are provided. Each LED 30-42 can be turned on (caused to be illuminated) or off by application of a suitable current through at least two of the terminals connected to the desired LED. As explained below, the control 22 dictates the LED to be illuminated, the waveform of the current to the LED, as well as the on-time and off-time as of the LED.

The LEDs 30-40 are arranged in pairs and each pair of LEDs is connected between a pair of terminals with the LEDs of each pair being connected in an opposite polarity. For example, the pair of LEDs 30 and 32 connects between terminals T2 and T3. The anode of LED 30 connects to terminal T2 and the cathode of LED 30 connects to terminal T3. LED 32, however, has its anode connected to terminal T3 and its cathode connected to terminal T2. LED pair 34, 36 connects between terminals T3 and T4 with the anode and cathode of LED 34 connected to terminals T4 and T3, respectively. The anode and cathode of LED 36 connects between terminals T3 and T4, respectively. Similarly, LEDS 38 and 40 connect between terminals T1 and T4. The anode and cathode of LED 38 connects between terminals T4 and T1, respectively, and the anode and cathode of LED 40 connects between terminals T1 and T4, respectively.

Although a pair of LEDs is shown connected between pairs of terminals in the embodiments of FIG. 2, in accordance with other embodiments, more than two LEDs can be so connected. Any LED shown in FIG. 2 can be replaced with multiple LEDs connected in series between the respective terminals. Additionally or alternatively, multiple LEDs, having a common orientation, can be connected in parallel between a common pair of terminals. For example, more than one LED can be connected between terminals T2 and T3 in the same orientation as LED 32.

The LED 42 connects between terminals T1 and T2 as shown (cathode connected to terminal T1 and anode connected to terminal T2). Although only a single LED 42 is shown connected between the pairs of terminals T1 and T2, in other embodiments, a pair of LEDs can be connected between T1 and T2.

In accordance with an embodiment of the invention, each of the LEDs 30-42 emit light of a different wavelength (color) than each of the other such LEDs, although some of the LEDs may be of the same color. An exemplary list of colors includes red, green, blue, yellow, cyan, and orange, etc. One of the LEDs, for example LED 40, may emit light outside the visible portion of the spectrum. Such an LED may comprise an infra-red LED that is used by the scanner 10, for example, to detect scratches on the object being scanned.

Figure 3:
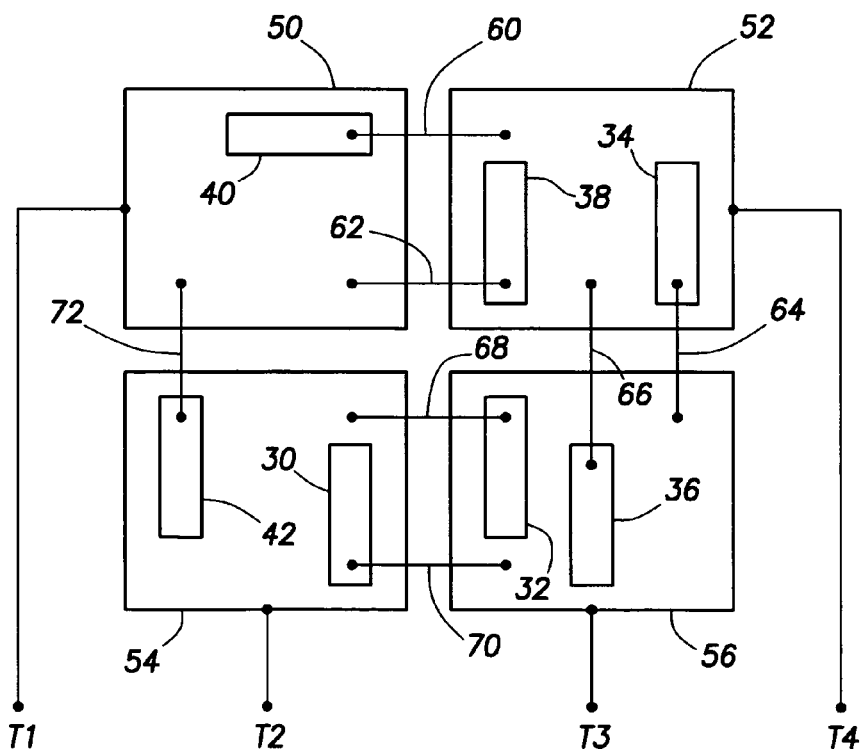
FIGS. 3-3B show at least some construction features regarding an illumination source in accordance with embodiments of the invention.

FIG. 3 shows an exemplary embodiment of the construction of illumination source 16. The LEDs 30-42 are shown in FIG. 3 as rectangles to illustrate that each LED is formed as a semiconductor die. The illumination source 16 also comprises a plurality of lead frames 50-54. Each lead frame comprises a conductive surface to which one or more LEDs can be coupled. As shown in the example of FIG. 3, LED 40 couples to lead frame 50 while LEDS 34 and 38 couple to lead frame 52. LEDs 32 and 36 couple to lead frame 56 and LEDs 30 and 42 couple to lead frame 54. The anode of each LED is electrically accessible via a bottom surface of the LED. Thus, the anode of an LED can be electrically connected to a lead frame by coupling the bottom surface of the LED to the lead frame. Each LED is coupled (e.g., bonded, soldered, etc.) to a lead frame as shown thereby connecting that LED's cathode to the corresponding lead frame.

The cathode of each LED is accessible from a top surface of the LED and can be connected to another conductive structure such as a lead frame by way of a wire bond. The cathode of LED 40 is connected by way of wire bond 60 to lead frame 52. The cathodes of LEDs 34 and 38 connect to lead frames 56 and 50, respectively, via wire bonds 64 and 62 as shown. The cathodes of LEDs 32 and 36 connect to lead frames 54 and 52 via wire bonds 68 and 66, respectively, while the cathodes of LEDs 30 and 42 connect to lead frames 56 and 50 via wire bonds 70 and 72, respectively. Terminal T1 connects to lead frame 50, while terminals T2, T3, and T4 connect to lead frames 54, 56, and 52, respectively.

Figure 3A:
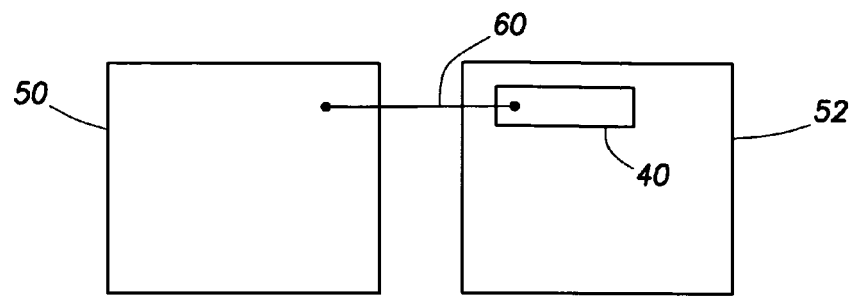

In other embodiments, the surface (e.g., the bottom surface) of each LED adjacent the lead frame comprises the LED's cathode and another surface (e.g., the top surface) comprises the LED's anode. FIG. 3A illustrates this embodiment in relation to LED 40. The bottom surface of LED 40 comprises the LED's cathode and the top surface comprises the LED's anode. Accordingly, the LED 40 is mated to lead frame 52 rather than lead frame 50 in this embodiment and wire bond 60 is used to couple the LED's anode to lead frame 50.

Figure 3B:
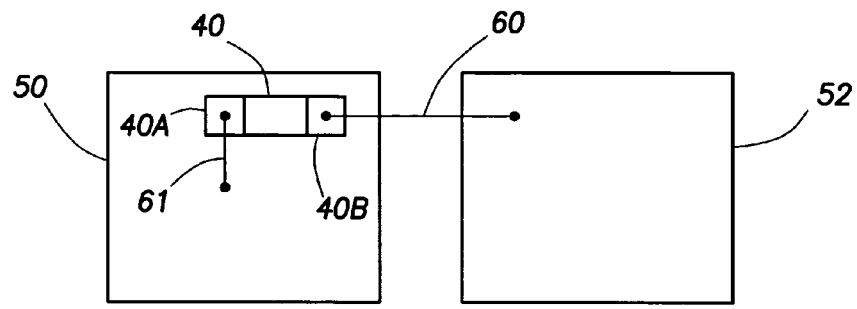

FIG. 3B illustrates yet another embodiment in which both the anode and cathode of an LED are on an exposed surface of the LED die. For example, the anode and cathode may both be on a top surface or on opposite, yet exposed, ends of the LED. In FIG. 3B, LED 40 comprises two conductive portions 40A and 40B on a common side. Portion 40A represents the LED's anode and couples to the lead frame 50 by way of a wire bond 61. Conductive portion 40B represents the LED's cathode and couples to lead frame 52 by way of wire bond 60. The same connection technique can be used for all LEDs in an illumination source 16. Alternatively, a mix of connection techniques can be used for illumination source 16 meaning that any LED in the illumination source 16 can be coupled to the lead frames using any of the connection techniques described herein or other techniques.

Figure 4:
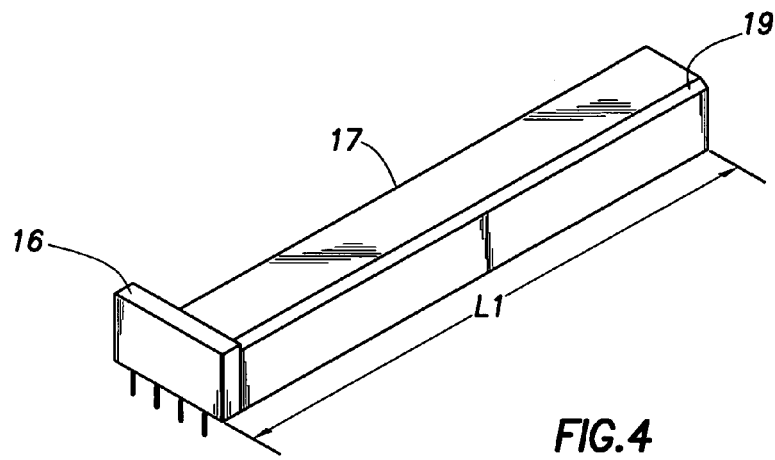
FIG. 4 shows an illumination source coupled to a light guide in accordance with embodiments of the invention.

FIG. 4 illustrates an embodiment of the illumination source 16 coupled to a transparent light guide 17. The LEDs in the illumination source 16 emit their light into the light guide. The light guide 17 includes a scattering, diffractive, or refractive pattern internal to the guide which causes the light to be scattered through a chamfered portion 19. The light is thus scattered across substantially the length L1 of the light guide 17 and onto an object to be scanned as the object and light guide move relative to one another.

FIG. 1 shows that the scanner 10 includes one or more current sources 26 and 28. Each of the current sources 26, 28 provides current, such as direct current (DC) in a predetermined waveform, to one or more of the terminals 17 (T1-T4) of the illumination source 16. As such, each current source can turn on at least one of the LEDs (i.e., cause an LED to illuminate). The current switch 24 can be configured by control logic 22 to couple a current source 26, 28 to any pair of terminals of the illumination source. The current switch 24 can be configured to couple both current sources 26, 28 to the same or different pair of terminals. The control logic 22 can also separately configure the output current waveform of each current source 26, 28. Parameters that can be configured by the control logic comprise any one or more of current magnitude, pulse width, on-time, off-time, etc. With multiple current sources that are individually controlled by control logic 22 and with use of the current switch 24, multiple LEDs can be turned on concurrently. In some embodiments, only one current source is used, while in other embodiments, multiple current sources are used.

Table I illustrates various states of operation of the illumination source 16 using the current sources 26, 28. Each state corresponds to one or two of the LEDs 30-42 being turned on using one or two current sources. The control logic 22 configures the current switch 24 and current sources 26, 28 to provide these operational states.

TABLE I

Operational States of the Illumination Source

| Op. State | LED 34 | LED 38 | LED 42 | LED 30 | LED 36 | LED 32 | LED 40 |
|---|---|---|---|---|---|---|---|
| 0 | off | Off | off | off | off | off | off |
| 1 | off | Off | off | off | off | ON | off |
| 2 | off | Off | ON | off | off | off | off |
| 3 | ON | Off | off | off | off | off | off |
| 4 | off | Off | off | off | ON | off | off |
| 5 | off | Off | off | ON | off | off | off |
| 6 | off | ON | off | off | off | off | off |
| 7 | off | Off | off | off | off | off | ON |
| 8 | off | Off | off | off | ON | ON | off |
| 9 | off | Off | ON | ON | off | off | off |
| 10 | ON | ON | off | off | off | off | off |
| 11 | ON | Off | off | ON | off | off | off |
| 12 | off | ON | ON | off | off | off | off |
| 13 | ON | Off | off | off | off | ON | off |
| 14 | ON | ON | off | off | off | ON | off |

In state 0, all of the LEDs are off. In states 1-7, only a single current source is used to turn on only a single LED. Each of states 1-7 has a different LED turned on as shown. In states 8-10, two LEDs are illuminated using two current sources. The LEDs so turned on are coupled in a common anode configuration. In states 11 and 12, two LEDs coupled in a common cathode configuration are turned on using two current sources. In state 13, a single current source is used to turn on two, serially-coupled LEDs. In state 14, two current sources are used to turn on three LEDs; two serially-coupled LEDs are illuminated by one current source and the third LED is illuminated using a second current source. Some of the states depicted in Table I are illustrated in FIGS. 5-9.

Figure 5:
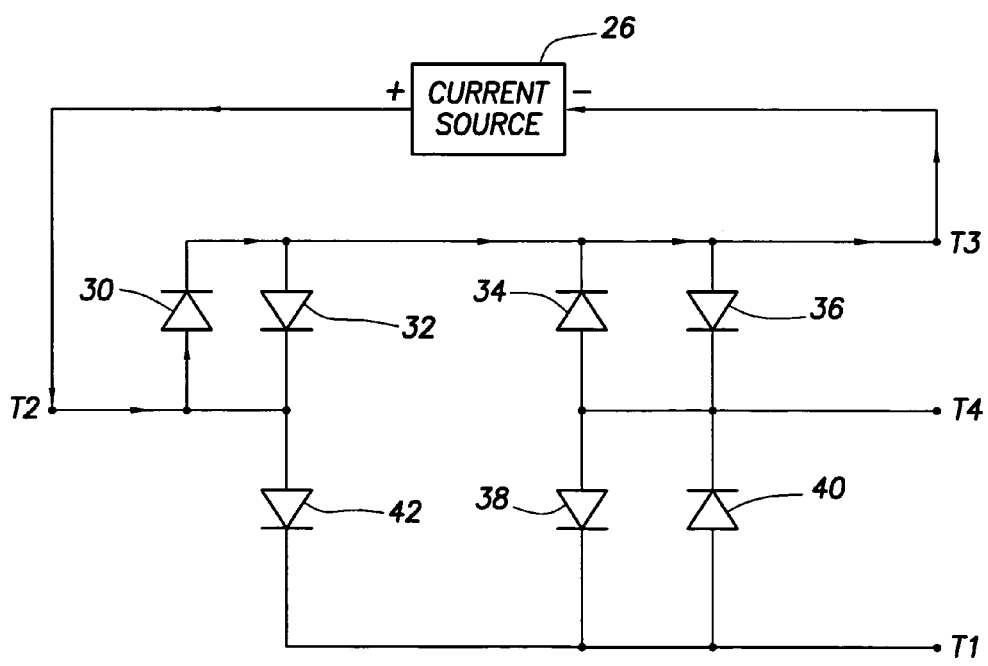
FIG. 5 shows the use of a current source with an illumination source in accordance with embodiments of the invention.

FIG. 5 corresponds to state 5 in Table I and shows an embodiment in which a single current source 26 is coupled by current switch 24 (FIG. 1) to cause a single LED, LED 30, to be turned on. In FIG. 5 as well as in FIGS. 6-9, the current sources are shown to emit positive current from the terminal labeled with a plus sign (+) and the return current enters the current source at the terminal labeled with a negative sign (−). The arrows also illustrate the direction of current flow. In FIG. 5, current flows from the current source 26, through terminal T2, to the anode of LED 30, through the LED 30 and back to the current source through terminal T3. As such, LED 30 is turned on. LED 32, being coupled with a reverse polarity to that of LED 30, remains off. No other LEDs are turned on in the example of FIG. 5. If the polarity of current source 26 were to be reversed (as can be accomplished by the current switch 24 under control of control logic 22), LED 32 would be turned on and not LED 30. A single current source can be connected by current switch 24 to other pairs of terminals to turn on individual other LEDs. Any of the seven LEDs can be turned on independently of the other LEDs in this manner and these single LED states correspond to states 1-7 of Table I.

Figure 6:
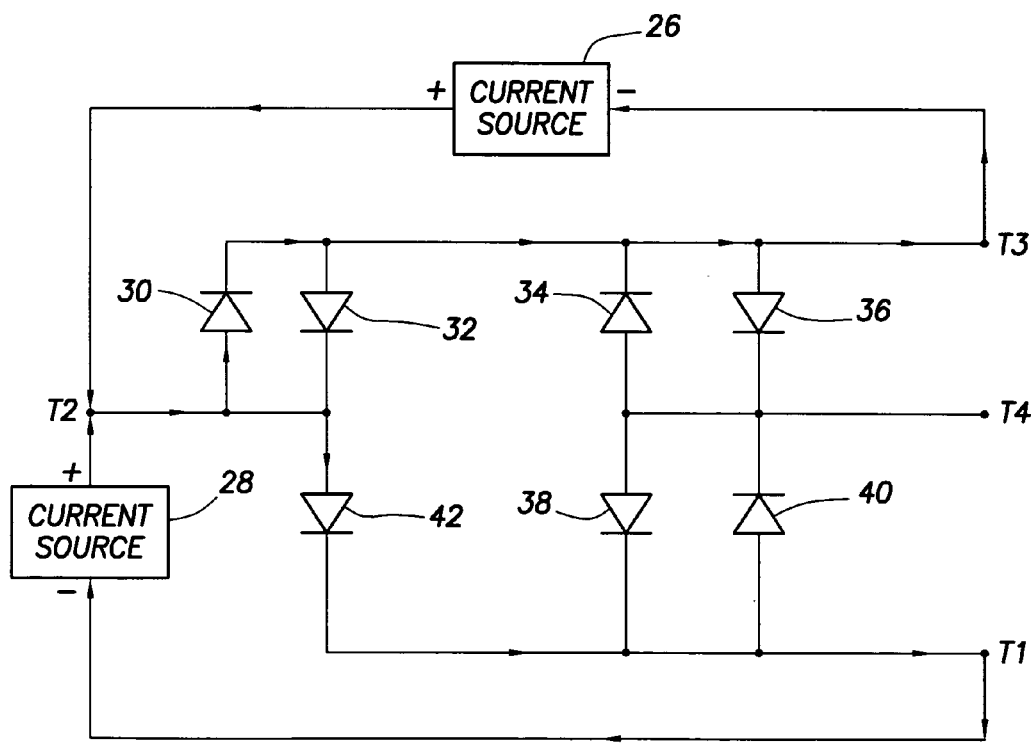
FIG. 6 shows the use of multiple current sources with an illumination source in accordance with alternative embodiments of the invention.
Figure 7:
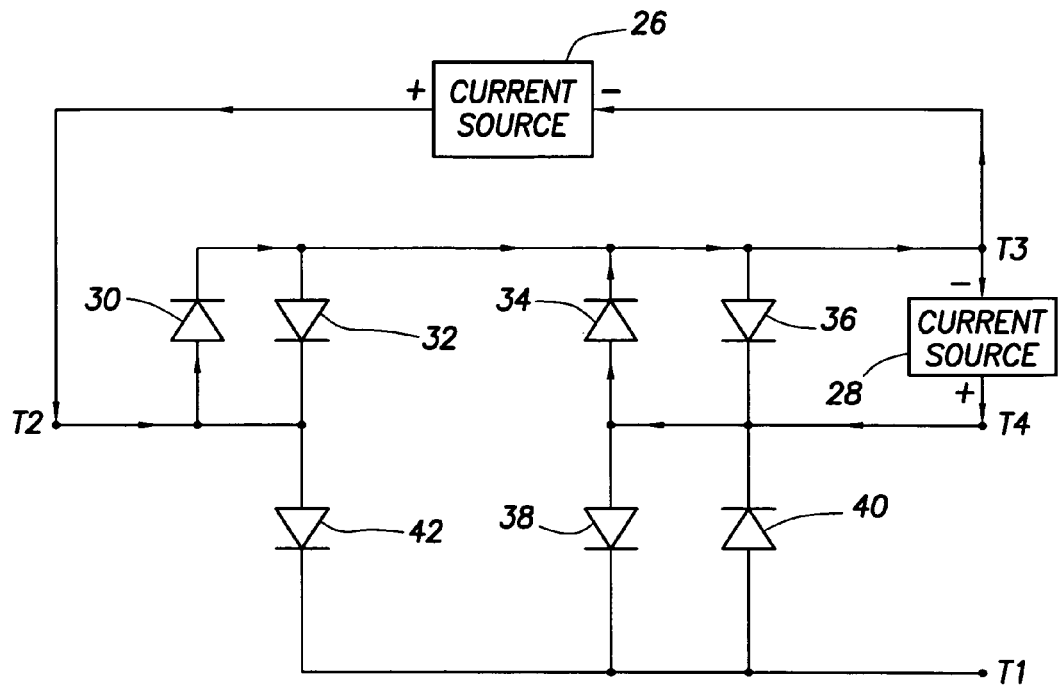
FIG. 7 shows the use of multiple current sources with an illumination source in accordance with alternative embodiments of the invention.

In the example of FIG. 6, two current sources 26 and 28 are coupled by current switch 24 to the illumination source 16. This configuration corresponds to state 9 in Table 1 in which LEDs 30 and 42 are turned on. Current source 26 illuminates LED 30 as described above with regard to FIG. 5. Current source 28 connects to terminals T1 and T2. The current from current source 28 flows through terminal T2 to the anode of LED 42, through the LED 42, and back to the current source 28 through terminal T1. As can be seen in FIG. 7, the anodes of LEDs 30 and 42 are both connected to terminal T2 in a common anode configuration.

In the example of FIG. 7, two current sources 26 and 28 again are used but are coupled to different terminals as compared to FIG. 6. The configuration of FIG. 7 corresponds to state 11 in Table I in which LEDs 30 and 34 are turned on. Current source 26 illuminates LED 30 as described above with regard to FIG. 5. Current source 28 connects to terminals T3 and T4. The current from current source 28 flows through terminal T4 to the anode of LED 34, through the LED 34 thereby turning on LED 34, and back to the current source 28 through terminal T3. The cathodes of LEDs 30 and 34 are connected to terminal T2 in a common cathode configuration.

Figure 8:
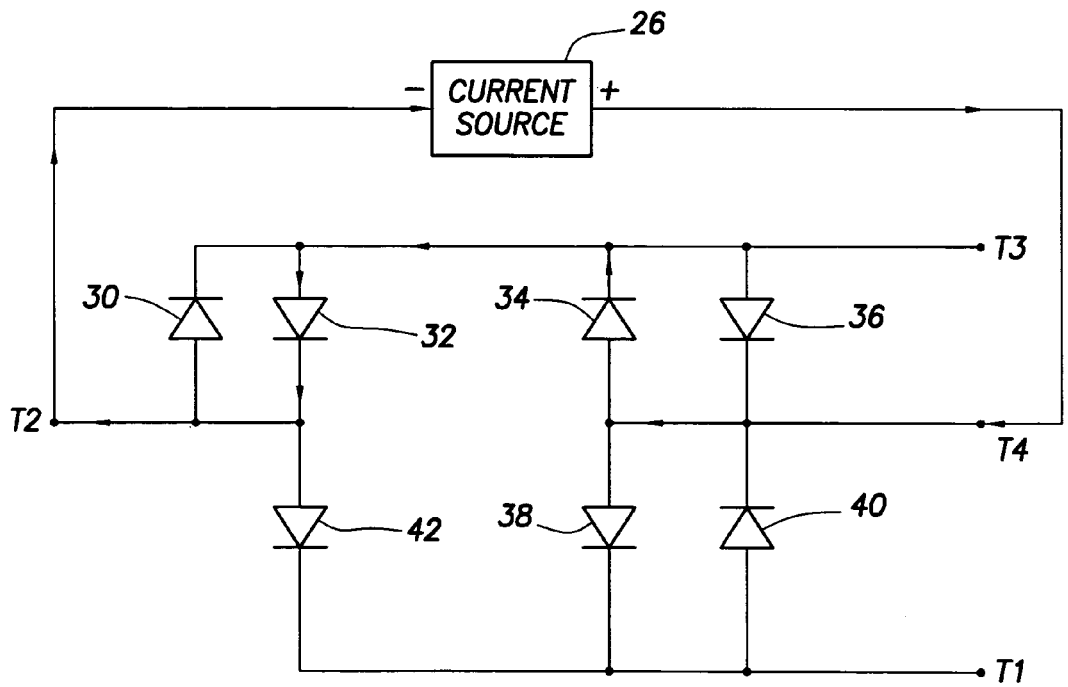
FIG. 8 shows the use of a single current source with an illumination source in accordance with alternative embodiments of the invention.

In the example of FIG. 8, a single current source 26 is used. This configuration corresponds to state 13 in Table I in which LEDs 32 and 34 are turned on. Current source 26 is coupled to terminals T2 and T4. Current from the current source 26 flows to the anode of LED 34, through LED 34, to the anode of LED 32, through LED 32 and back to the current source 26 through terminal T2. LEDs 32 and 34 are effectively coupled in series in this configuration.

Figure 9:
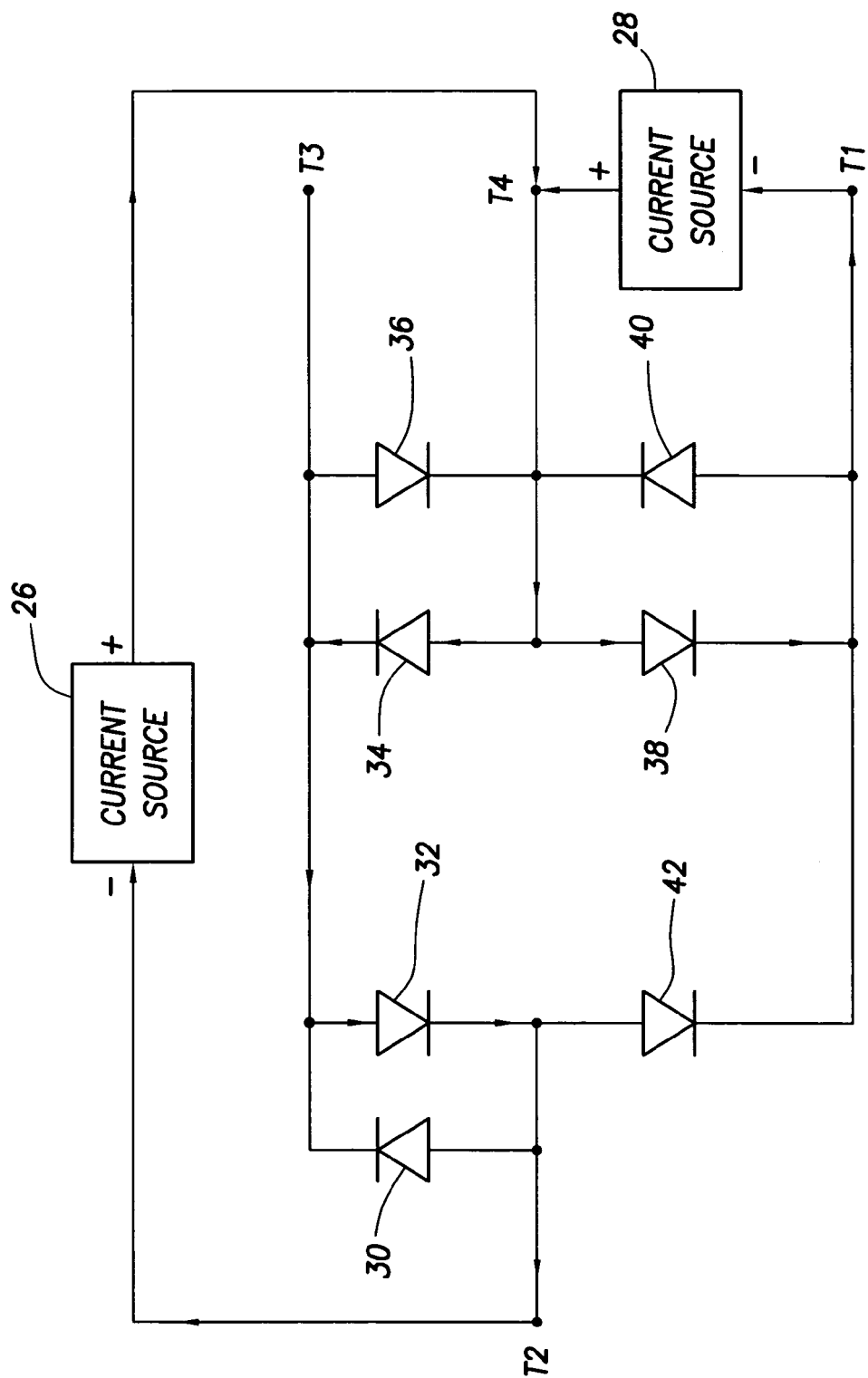
FIG. 9 shows the use of multiple current sources with an illumination source in accordance with alternative embodiments of the invention.

In the example of FIG. 9, two current sources 26 and 28 are used. This configuration corresponds to operational state 14 of Table I. Current source 26 couples to terminals T2 and T4 (as in FIG. 8) and current source 28 couples to terminals T4 and T1. Current source 26 provides current through terminal T4, to the anode of LED 34, through LED 34, to the anode of LED 32, through LED 32 and back to the current source through terminal T2. In this current path, two LEDs 34 and 32 are coupled in series and thus turned on. Current from current source 28 flows through terminal T4, to the anode LED 38, through LED 38 and back to the current source through terminal T1. In this configuration, three LEDs are turned on in a series, a pair of LEDs illuminated by one current source and another LED turned on by another current source.

As explained above, illumination source 16 comprises more LEDs (e.g., seven LEDs) than terminals (e.g., four terminals). The number of colors of LEDs enables the creation of a higher quality scanned image than would be possible with a scanner that has fewer colors. The number of colors corresponds to the number of different colored LEDs as well as blended colors made possible by turning on multiple LEDs concurrently. Further, having fewer terminals than LEDs means that the package size of the illumination source may be smaller than might otherwise be the case. Further, having at least one infra-red LED enables dust and scratch removal to achieve better image quality The various operation states illustrated in Table I and combinations thereof make possible any of a variety of illumination protocols. Examples of such protocols are illustrated below with regard to FIGS. 10-17.

Figure 10:
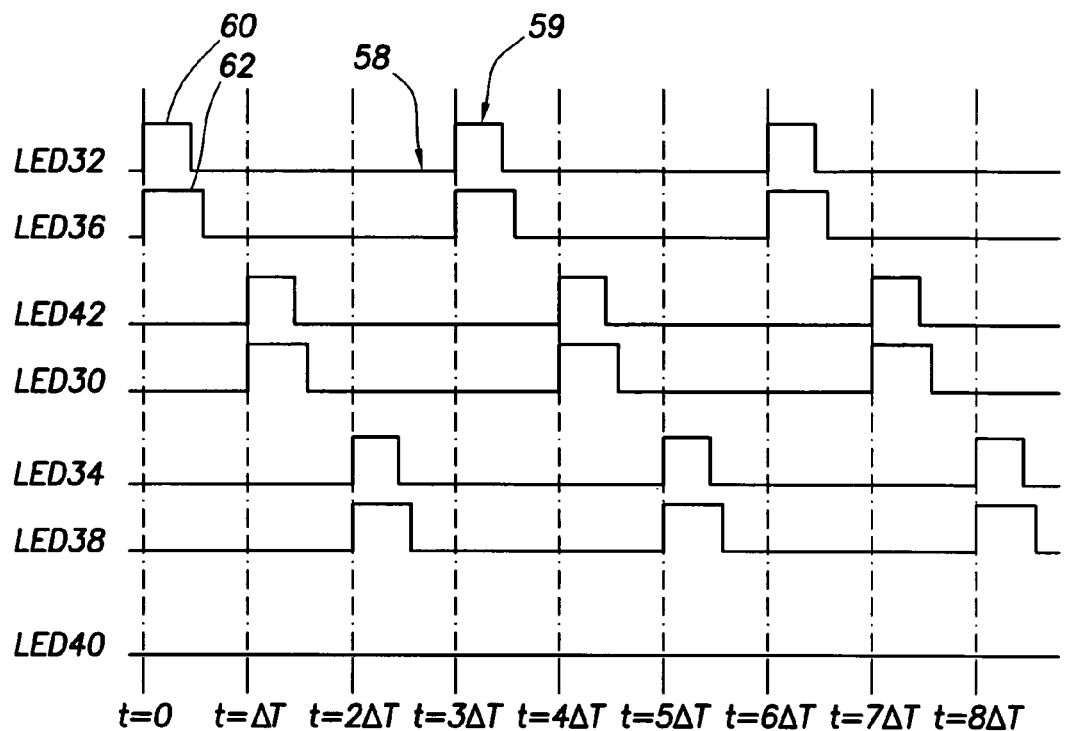
FIG. 10 illustrates an illumination protocol in accordance with an embodiment of the invention.

FIG. 10 shows a time sequence in which various of the LEDs are turned on and off by action of control logic 22 and current switch 24. The time sequence begins at t=0 along the x-axis and increases in units of ΔT. The seven LEDs of FIG. 2 are listed on the y-axis. The waveform associated with each LED in the example of FIG. 10 depicts the current provided to an LED by a current source 26, 28 through current switch 24. Each waveform at any point in time is either at a low state (e.g., state 58) or at a high state (e.g., state 59). A low state indicates that the associated LED is turned off (not illuminated) while a high state indicates that the associated LED is turned on (illuminated). During at least portion of the time from t=0 to t=ΔT, LEDs 32 and 36 are turned on concurrently, as shown by high states 60 and 62 of their associated waveforms, and all other LEDs are turned off. LEDs 32 and 36 may be turned on and off at the same instants of time, turned on at the same time and turned off at different times (as illustrated in FIG. 10), turned on at different times and turned off at the same time, or turned on and off at different times. LEDs 32 and 36 both being on concurrently corresponds to state 8 of Table I.

Figure 11:
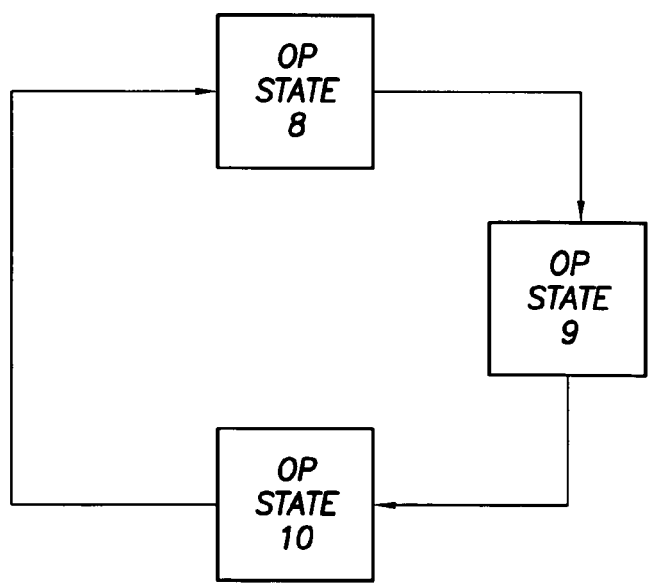
FIG. 11 illustrates a state diagram associated with the illumination protocol of FIG. 10.

During at least a portion of the time from t=ΔT to t=2ΔT, LEDs 42 and 30 are turned on concurrently and all other LEDs are turned off. This configuration of LEDs being turned on corresponds to state 9 of Table 1. Similarly, during at least part of the time from t=2ΔT to t=3ΔT, LEDs 34 and 38 are turned on concurrently and all other LEDs are turned off. This configuration of LEDs being turned on corresponds to state 10 of Table I. This illumination protocol in which pairs of LEDs are turned on and off in sequence repeats beginning at t=3ΔT. LED 40 remains off in this particular illumination protocol. FIG. 11 illustrates in state diagram form that the illumination protocol of FIG. 10 switches from operational state 8, to state 9, to state 10, and back to state 8 in a repeating manner. Each state of the state diagram of FIG. 11 is implemented by the control logic 22 reconfiguring the current switch 24 to couple the current sources 26, 28 to predetermined pairs of terminals of the illumination source 16 so as to cause a selected pair of LEDs to illuminate for that state. The current waveform comprising at least the magnitude and shape of each current pulse, causing an LED to illuminate, is also controlled by control logic 22 as it configures the current sources. The control logic 22 causes the desired illumination protocol to be performed during, for example, a scan operation.

Figure 12:
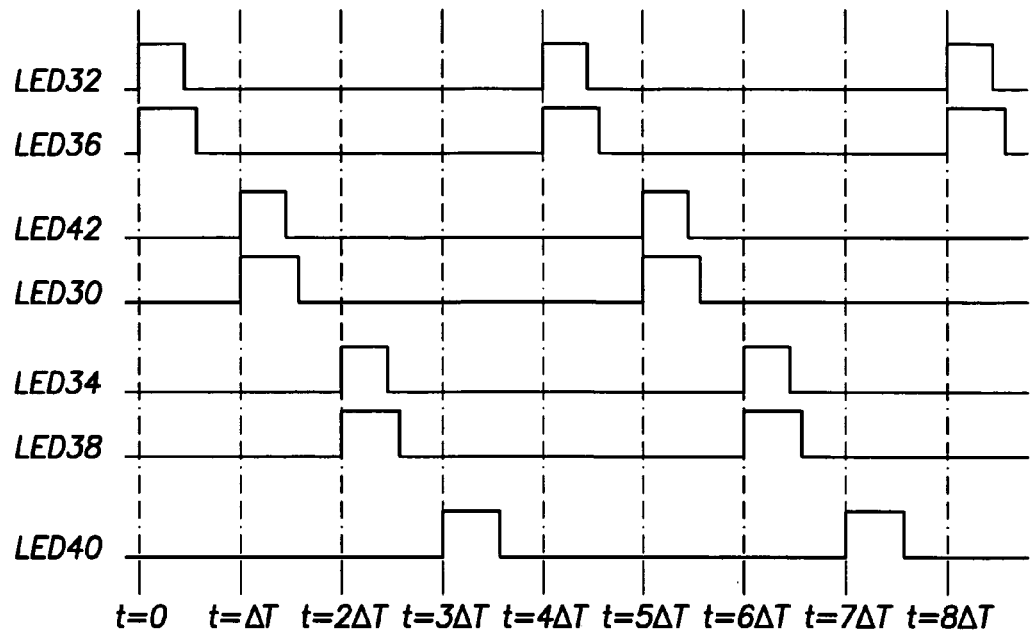
FIG. 12 illustrates an illumination protocol in accordance with an alternative embodiment of the invention.
Figure 13:
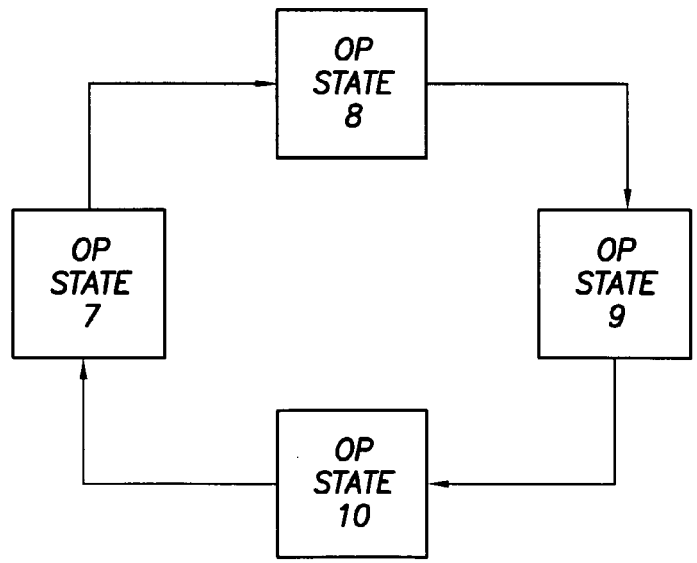
FIG. 13 illustrates a state diagram associated with the illumination protocol of FIG. 12.

FIG. 12 illustrates another illumination protocol similar to that of FIG. 10. In FIG. 12, however, LED 40 is turned on in a fourth state of a repeating pattern. Thus, LEDs 32 and 36 are turned on, then LEDs 42 and 30, then LEDs 34 and 38, and finally LED 40. These four states correspond to operational states 8, 9, 10, and 7 of Table I, respectively, and are illustrated in state diagram form in FIG. 13.

Figure 14:
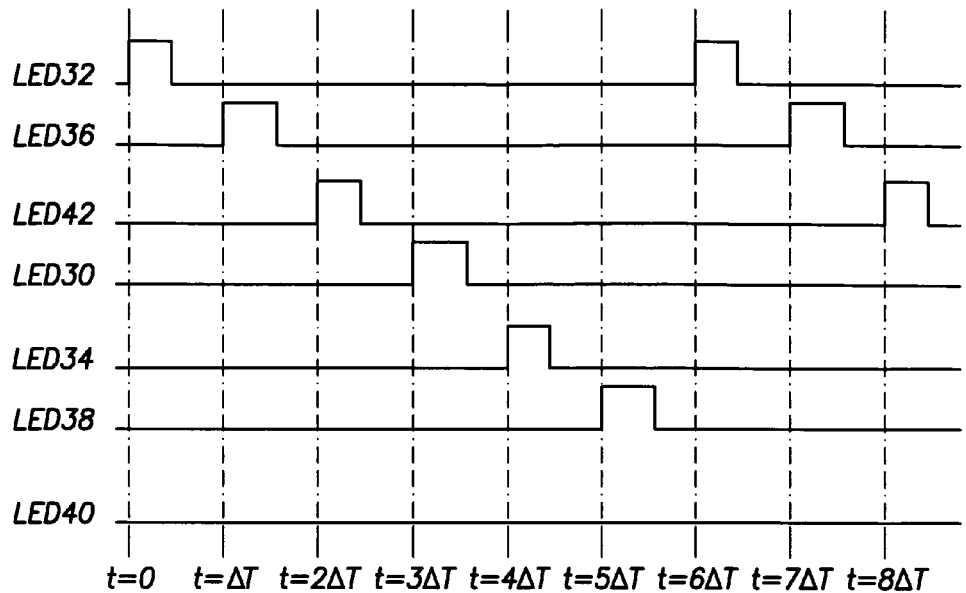
FIG. 14 illustrates an illumination protocol in accordance with an alternative embodiment of the invention.
Figure 15:
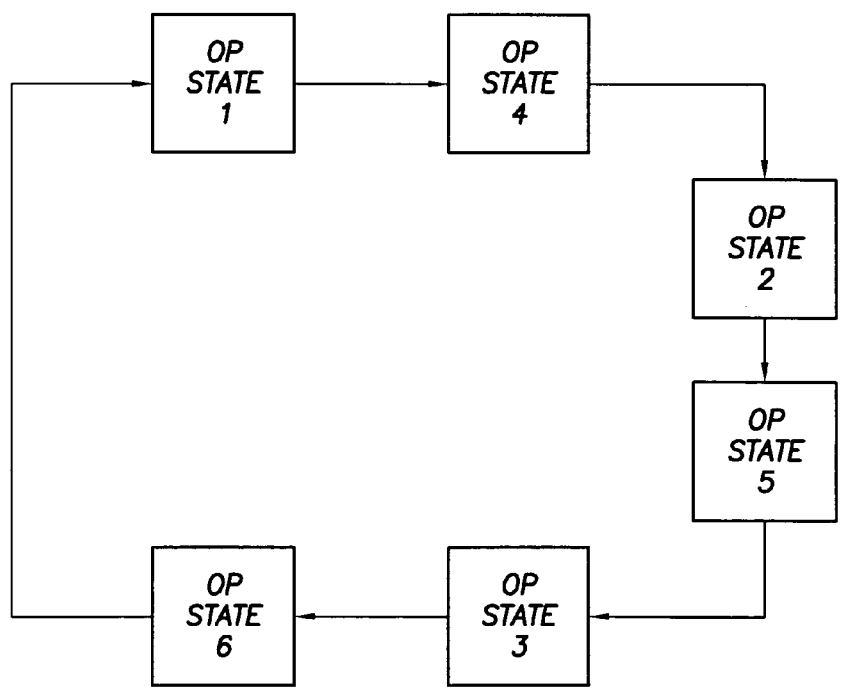
FIG. 15 illustrates a state diagram associated with the illumination protocol of FIG. 14.

In accordance with the illumination protocol of FIG. 14, each of six LEDs (LEDs 32, 36, 42, 30, 34, and 38) are turned on, one at a time, in the order shown. Thus, in at least a portion of the time between t=0 and t=ΔT, LED 32 is turned on. In at least part of the time between t=ΔT and t=2ΔT, LED 36 is turned on, and so on, until LED 38 is illuminated between t=5ΔT and t=6ΔT. LED 40 remains off and the pattern repeats at t=6ΔT. LED 32 being illuminated corresponds to state 1 in Table I. Similarly, LEDs 36, 42, 30, 34, and 38 being turned on correspond to states 4, 2, 5, 3, and 6, respectively. FIG. 15 shows the corresponding state diagram comprising, in order, states 1, 4, 2, 5, 3, and 6.

Figure 16:
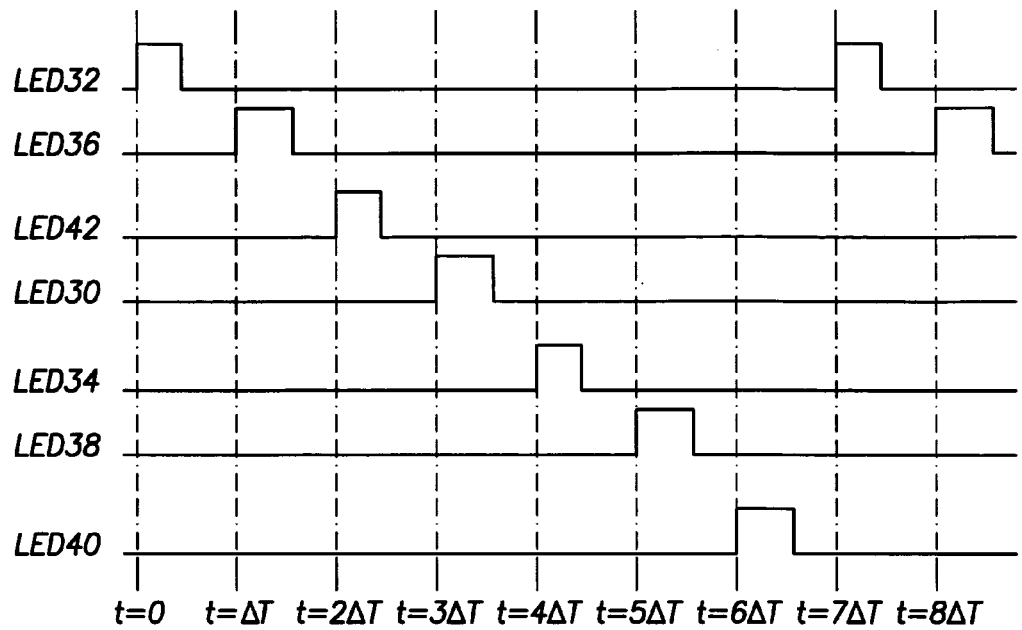
FIG. 16 illustrates an illumination protocol in accordance with an alternative embodiment of the invention.
Figure 17:
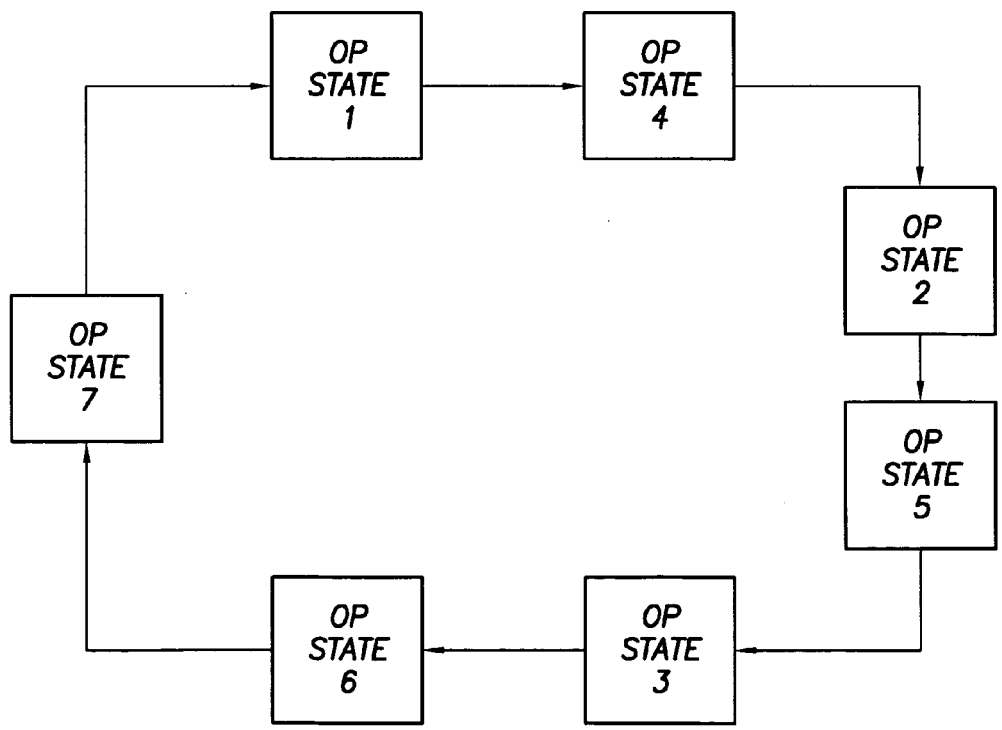
FIG. 17 illustrates a state diagram associated with the illumination protocol of FIG. 16.

The illumination protocol of FIG. 16 is similar to that of FIG. 15 except that all seven LEDs are turned on in sequence as shown through t=6ΔT with the pattern repeating thereafter. LED 40 being turned on corresponds to state 7 of Table I. The state diagram of FIG. 17 thus includes the seven states that correspond to the protocol of FIG. 16.

Increasing the brightness or radiant energy of an illumination source generally leads to higher quality scanned images. An illumination source 100 such as that illustrated in FIG. 18 can be used for increased brightness or intensity (i.e., illumination power). The illumination source 100 comprises a plurality of groups of different emission-spectrum LEDs (e.g., different colors). Any number of groups of LEDs can be provided such as two or more, three or more, four or more, six or more, etc. The exemplary embodiment of FIG. 18 comprises seven groups of different emission-spectrum LEDs. The seven groups are labeled 102, 104, 106, 108, 110, 112, and 114. Group 102 comprises LEDs 102a, 102b, and 102c and all have the same emission-spectrum (e.g., blue). Group 104 comprises LEDs 104a and 104b and all have the same emission-spectrum, and which may differ from, or be the same as, that of the LEDs of group 102. Group 106 comprises LEDs 106a-106f. Group 108 comprises LEDs 108a and 108b. Group 110 comprises LEDs 110a and 110B. Group 112 comprises LEDs 112a and 112b, while group 114 comprises LEDs 114a-114c. The emission-spectrum of all or some of the LED groups may be within or outside the visible portion of the electromagnetic spectrum.

The emission-spectrum of the LEDs within a single group are all the same in accordance with at least some embodiments. The emission-spectrum, however, may differ from group to group. At least one group has an emission spectrum that differs from at least one other group. The seven groups of LEDs, for example, may comprise LEDs of seven different colors (blue, red, green, orange, etc.). If desired, one or more groups can be of the same emission-spectrum.

Figure 18:
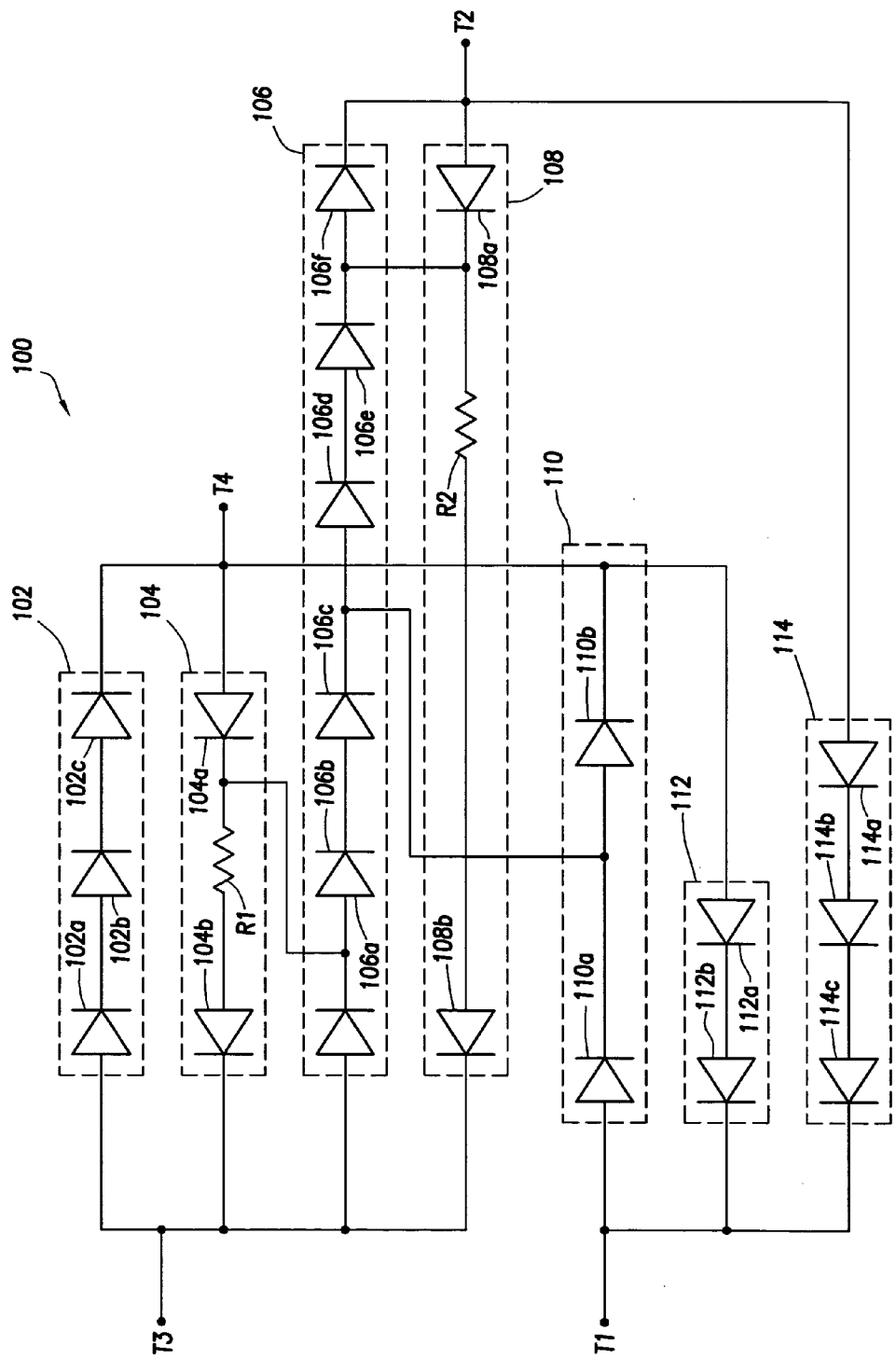
FIG. 18 illustrates an illumination source in accordance with alternative embodiments of the invention.

Each group of LEDs comprises at least one LED. In accordance with embodiments of the invention, to the extent that more than one LED is included in a particular group, the LEDs of that group are serially-coupled with the cathode of one LED connected to the anode of the next LED in series. In some embodiments, the illumination source 100 comprises at least one group of LEDs that has a different number of LEDs from that of at least one other group. In the example of FIG. 18, each of groups 104, 108, 110 and 112 comprises two LEDs, while each of groups 102 and 114 comprise three LEDs and group 106 comprises six LEDs. The number of LEDs of any one or more groups can be varied from that shown in the example FIG. 18. Having multiple LEDs of the same emission-spectrum in series in a single group enables multiple LEDs of the same emission-spectrum to be turned on at the same time, thereby increasing the brightness or intensity (illumination power) of that particular emission-spectrum compared to having fewer LEDs of that particular emission-spectrum. Different embodiments of the illumination source 100 comprises different number of LEDs in each group from that shown in FIG. 18 in accordance with the scanning application in which the illumination source is to be used. Two resistors R1 and R2 are shown in FIG. 18. These resistors are used to balance the currents as may be appropriate for a given application. In other embodiments, other passive components could be used in place of either or both resistors R1 and R2. For example, diodes could be used to prevent exceeding reverse current of LED group 108 when group 108 experiences a reverse voltage due to the LEDs of group 106 being turned on.

The LEDs in group 102 are connected between terminals T3 and T4 with their anodes towards terminal T3 and cathodes towards terminal T4. The LEDs in group 104 also are coupled between terminals T3 and T4 but in an opposite polarity from one another. Groups 106 and 108 of LEDs couple between terminals T3 and T2 with an opposite polarity as shown. Similarly, groups 110 and 112 couple between terminals T1 and T4 with an opposite polarity from one another. Group 114 couples between terminals T2 and T1 without an oppositely coupled LED group. If desired, another LED group can be included and coupled between terminals T2 and T1 with a polarity opposite that of group 114. In a fashion similar to that described above, applying current to a pair of terminals causes one of the groups of LEDs to turn on depending on the direction of the current flow. Further still, with multiple terminals, multiple current sources can be applied to concurrently turn on multiple groups of LEDs as explained previously.

Figure 19:
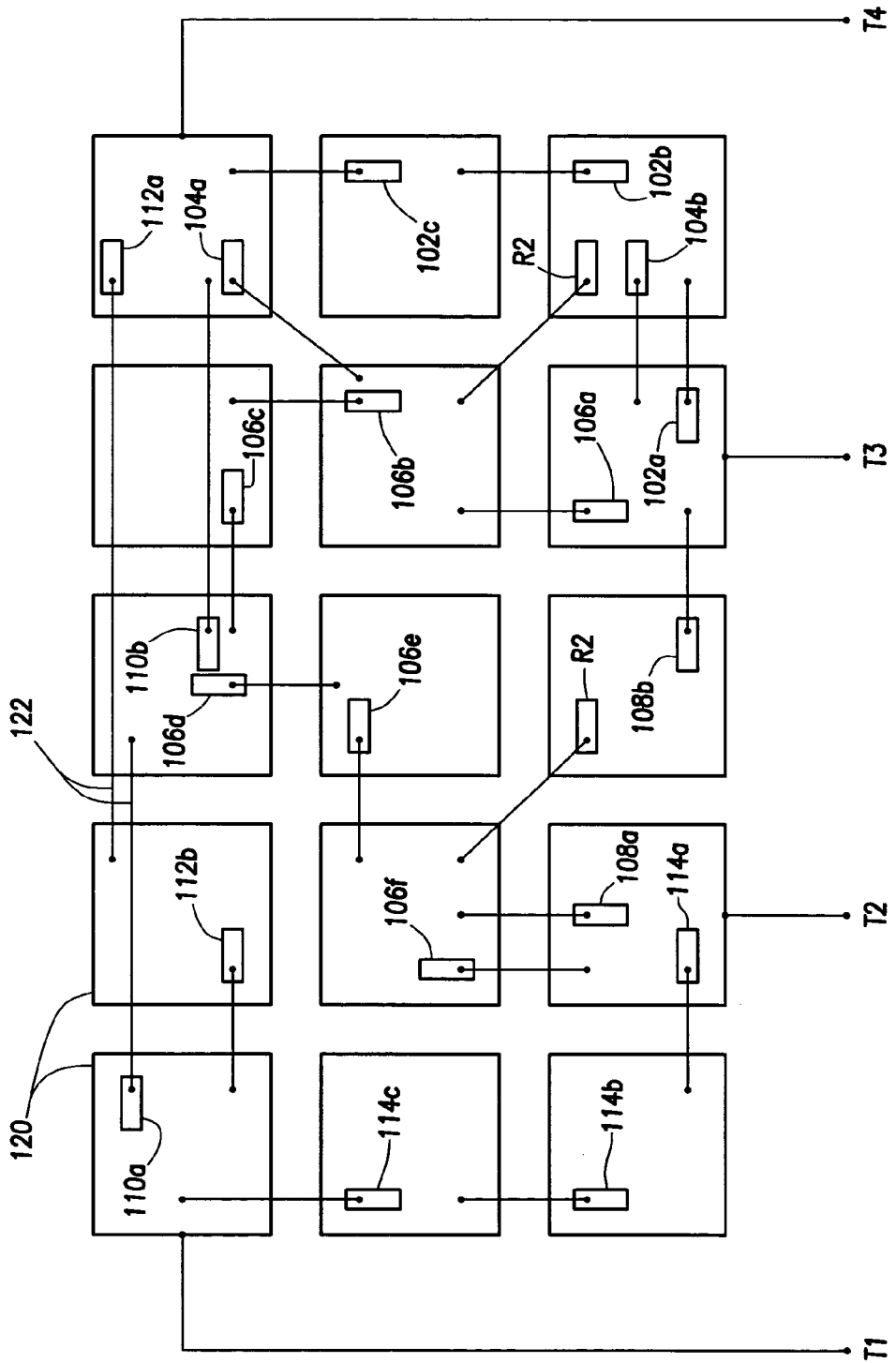
FIG. 19 shows at least some construction features regarding an illumination source in accordance with embodiments of the invention.

FIG. 19 illustrates the construction of the illumination source. In the embodiment shown in FIG. 19, the illumination source comprises a plurality of lead frames 120 arranged, in some embodiments, in an array. One or more LEDs, depicted in rectangular form to represent a semiconductor die, are attached to each lead frame. Resistors R1 and R2 are also show in rectangular form to depict those resistors in a form suitable for attachment to a lead frame. As before, one surface of each LED die is connected to the anode and another surface is connected to the cathode. In the embodiment of FIG. 19, the anodes are the bottom surface and thus electrically connected to the lead frame 120 when the LED die is attached to the lead frame. The cathodes are connected to an upper surface of the die and wire bonds 122 connect the cathodes to another lead frame. Terminals T1-T4 are electrically connected to four of the lead frames 120 as shown. Any of the connection techniques described above, such as that of FIGS. 3, 3A and 3B, can be used for any or all of the LEDs/passive components.

Figure 20:
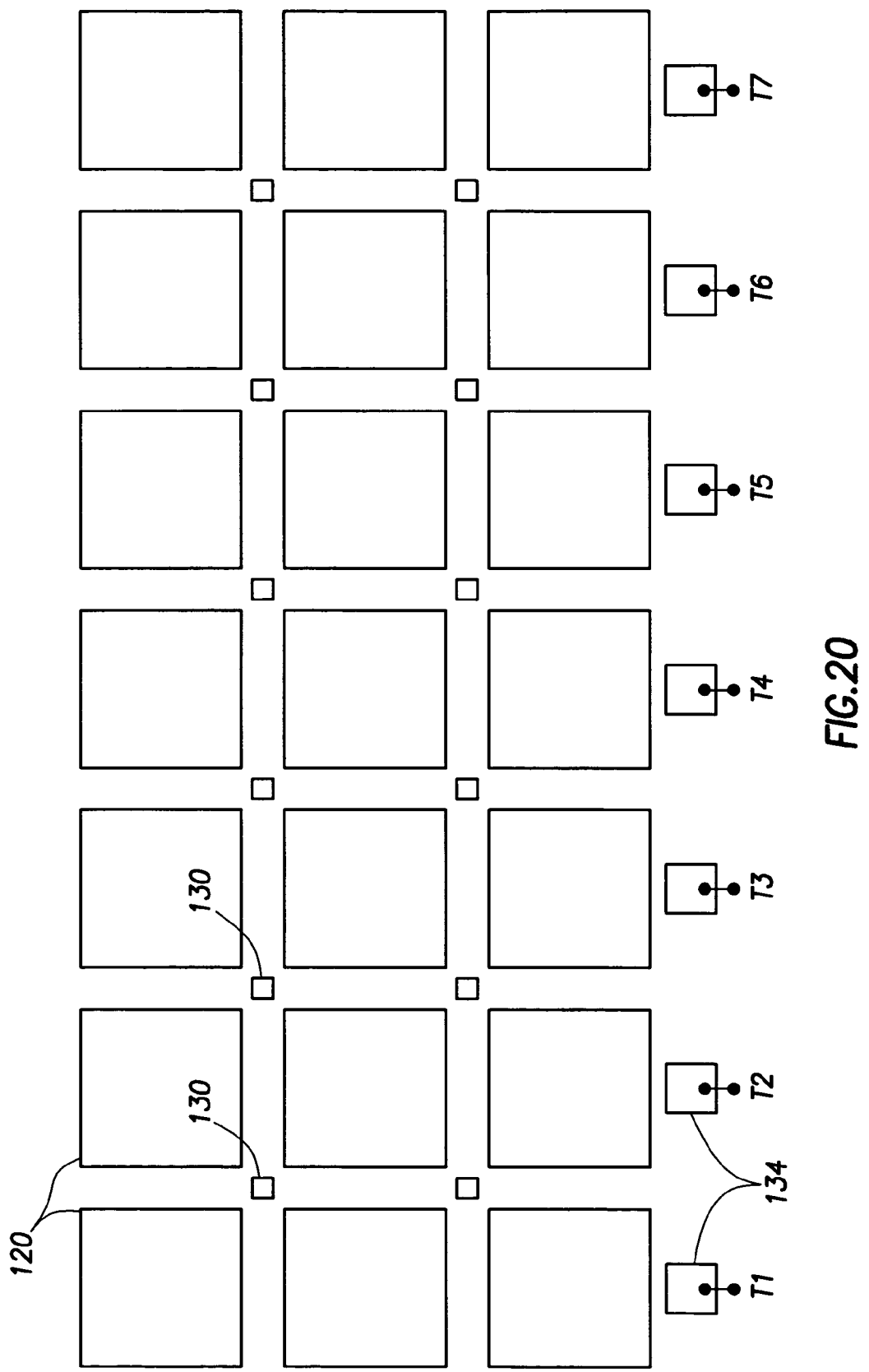
FIG. 20 shows at least some construction features regarding an illumination source in accordance with alternative embodiments of the invention.

FIG. 20 illustrates an embodiment of a connection infrastructure for the illumination source as comprising an array of lead frames 120 similar to that shown in FIG. 19. The LED dies and resistors are not specifically shown in FIG. 20. Adjacent the four corners of four neighboring lead frames are connection pads 130. The terminals are provided along a row of lead frames. In the particular embodiment of FIG. 20, there are seven terminals, but other embodiments can have any number of terminals as may be appropriate for a given application. Wire bonds can be connected from an LED die or passive component, such as a resistor or diode, to a connection pad 130 and another wire bond can be connected from that connection pad to a destination lead frame. The connection pads 130 help avoid using long wire bonds. Long wire bonds can be fragile, easy to break, and make it difficult to route the connection across the package so as not to short together various wire bonds.

Figure 21:
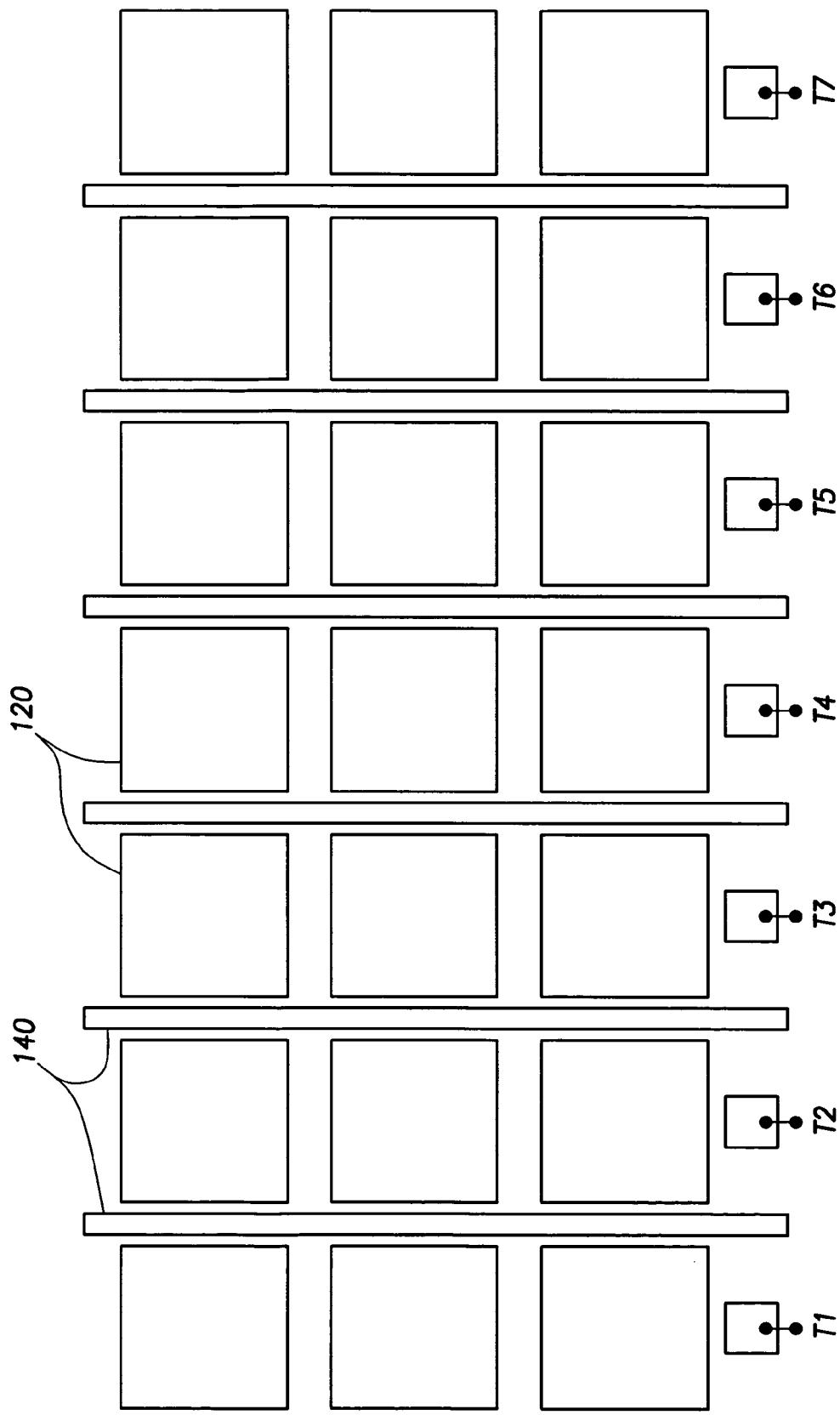
FIG. 21 shows at least some construction features regarding an illumination source in accordance with alternative embodiments of the invention.

FIG. 21 illustrates yet another embodiment of the connection infrastructure. Instead of connection pads 130, connection bus lines 140 that run between two columns of lead frames 120. As with the connection pads 130, wire bonds can be connected from an LED die or a passive component (e.g., resistor, diode) to a bus line 140 and then another wire bond can be connected from any point along that bus line 140 to a destination lead frame or terminal.

Figure 22:
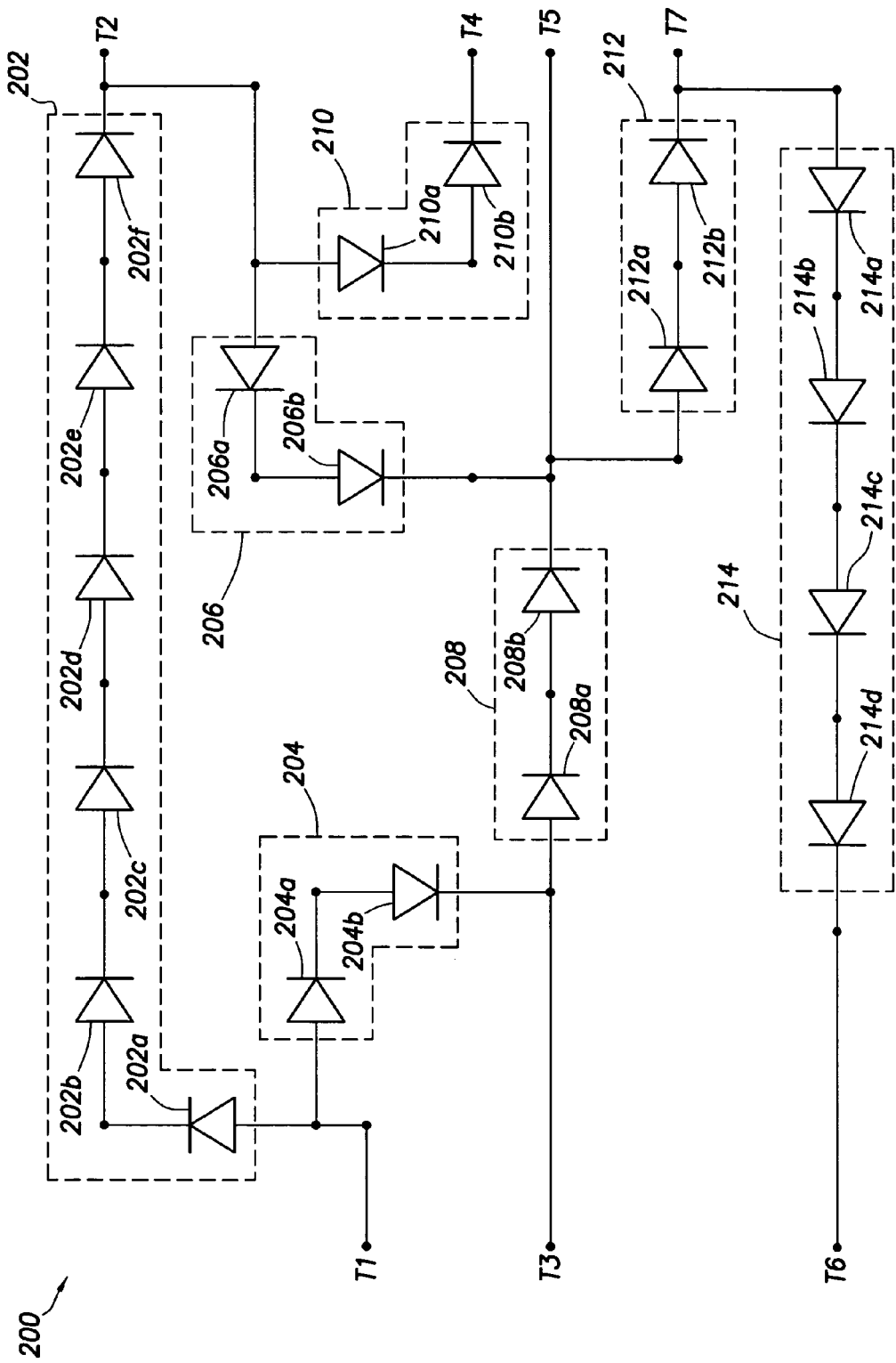
FIG. 22 shows an illumination source in accordance with alternative embodiments of the invention.
Figure 23:
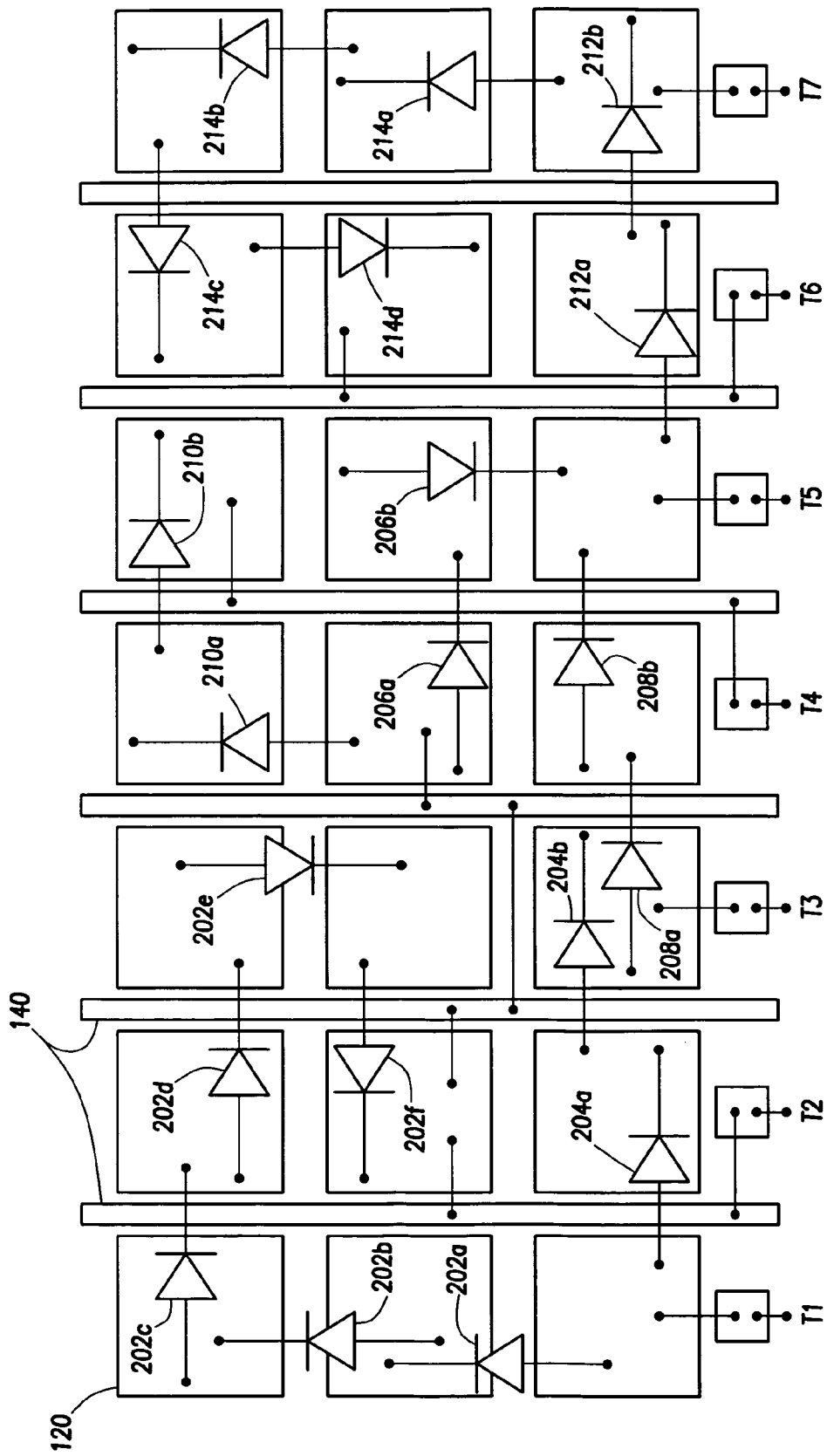
FIG. 23 shows at least some construction features regarding an illumination source in accordance with alternative embodiments of the invention.

FIG. 22 illustrates yet another embodiment of an illumination source 200. The illumination source comprises multiple groups 202-214 of LEDs, with each group comprising LEDs of a common emission-spectrum. The emission-spectrum one group's LEDs may be the same or different from the emission-spectrum of another group's LEDs. Group 202 comprises six, serially-coupled LEDs 202a-202f. Group 204 comprises two serially-coupled LEDs 204a-204b. Group 206 comprises two serially-coupled LEDs 206a-206b. Group 208 comprises two serially-coupled LEDs 208a-208b. Group 210 comprises two serially-coupled LEDs 210a-210b. Group 212 comprises two serially-coupled LEDs 212a-212b. Group 214 comprises four serially-coupled LEDs 214a-214b. The groups are connected between the various seven terminals T1-T7 as shown. FIG. 23 shows an array of lead frames 120 and a plurality of bus lines 140 used to interconnect the various LEDs and terminals.

The architecture of the LEDs comprising an illumination source can as shown and described herein or in accordance with numerous other embodiments as may be suitable for a given application. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An illumination source for a scanner, comprising:
   a plurality of terminals; and
   a plurality of light emitting diodes (LEDs), at least two LEDs having different wavelengths, each LED to be turned on and off via a signal provided to a terminal to which that LED is coupled;
   wherein the number of LEDs is greater than the number of terminals,
   wherein each LED is directly coupled to two of the terminals such that there are no intervening LEDs between each LED and the two of the terminals to which the LED is coupled,
   wherein the plurality of terminals comprises a first terminal, a second terminal, a third terminal, and a fourth terminal,
   and wherein the plurality of LEDs comprises:
   a first LED and a second LED directly coupled to the second terminal and to the third terminal, such that there are no intervening LEDs between each of the first and the second LEDs and each of the second and the third terminals, and such that the first LED and the second LED are coupled between the second terminal and the third terminal in an opposing polarity manner;
   a third LED and a fourth LED directly coupled to the third terminal and to the fourth terminal, such that there are no intervening LEDs between each of the third and the fourth LEDs and each of the third and the fourth terminals, and such that the third LED and the fourth LED are coupled between the third terminal and the fourth terminal in an opposing polarity manner;
   a fifth LED and a sixth LED directly coupled to the first terminal and to the fourth terminal, such that there are no intervening LEDs between each of the fifth and the sixth LEDs and each of the first and the fourth terminals, and such that the fifth LED and the sixth LED are coupled between the first terminal and the fourth terminal in an opposing polarity manner.

2. The illumination source of claim 1 further comprising a light guide through which light from the LEDs passes.

3. A scanner, comprising:
   a detector; and
   an illumination source comprising a plurality of terminals and a plurality of light emitting diodes (LEDs), at least two LEDs being of different wavelengths, each LED turned on and off via a signal, wherein the number of LEDs is greater than the number of terminals;

wherein the detector receives light emitted by said LEDs and reflected by, or transmitted through, an object being scanned, wherein each LED is directly coupled to two of the terminals such that there are no intervening LEDs between each LED and the two of the terminals to which the LED is coupled, wherein the plurality of terminals comprises a first terminal, a second terminal, a third terminal, and a fourth terminal, and wherein the plurality of LEDs comprises:

a first LED and a second LED directly coupled to the second terminal and to the third terminal, such that there are no intervening LEDs between each of the first and the second LEDs and each of the second and the third terminals, and such that the first LED and the second LED are coupled between the second terminal and the third terminal in an opposing polarity manner;

a third LED and a fourth LED directly coupled to the third terminal and to the fourth terminal, such that there are no intervening LEDs between each of the third and the fourth LEDs and each of the third and the fourth terminals, and such that the third LED and the fourth LED are coupled between the third terminal and the fourth terminal in an opposing polarity manner;

a fifth LED and a sixth LED directly coupled to the first terminal and to the fourth terminal, such that there are no intervening LEDs between each of the fifth and the sixth LEDs and each of the first and the fourth terminals, and such that the fifth LED and the sixth LED are coupled between the first terminal and the fourth terminal in an opposing polarity manner.

4. The scanner of claim 3 wherein said plurality of terminals comprise two pairs of terminals, and wherein two LEDs are connected in an opposite polarity between the terminals in each pair.

5. The scanner of claim 3 further comprising a plurality of current sources, each current source adapted to provide current through a pair of terminals to selectively turn on multiple LEDs concurrently.

6. The scanner of claim 3 further comprising control logic configured to cause pairs of LEDs to turn on concurrently, one pair at a time.

7. The scanner of claim 3 further comprising control logic configured to cause at least one pair of LEDs to turn on concurrently and at least one other LED is also turned on.

8. The scanner of claim 3 further comprising control logic configured to cause each of said LEDs to be turned on sequentially.

9. The scanner of claim 3 further comprising a plurality of current sources, each current source adapted to provide current through a pair of terminals to selectively turn on at least one LED.

10. The scanner of claim 3 further comprising control logic that separately controls a current waveform of each current source.

11. The scanner of claim 3 further comprising control logic that concurrently causes at least one pair of LEDs of different wavelengths to turn on followed by at least one other LED to turn on.

12. A scanner, comprising:

an illumination source comprising a plurality of terminals and a plurality of light emitting diodes (LEDs) of different wavelengths, each LED to be turned on and off via a signal provided to a terminal associated with that LED; and control logic that, during a scan, causes at least one pair of LEDs to turn on concurrently after which causing at least one other LED to also turn on, wherein the plurality of terminals comprises a first terminal, a second terminal, a third terminal, and a fourth terminal, and wherein the plurality of LEDs comprises:

a first LED and a second LED directly coupled to the second terminal and to the third terminal, such that there are no intervening LEDs between each of the first and the second LEDs and each of the second and the third terminals, and such that the first LED and the second LED are coupled between the second terminal and the third terminal in an opposing polarity manner;

a third LED and a fourth LED directly coupled to the third terminal and to the fourth terminal, such that there are no intervening LEDs between each of the third and the fourth LEDs and each of the third and the fourth terminals, and such that the third LED and the fourth LED are coupled between the third terminal and the fourth terminal in an opposing polarity manner;

a fifth LED and a sixth LED directly coupled to the first terminal and to the fourth terminal, such that there are no intervening LEDs between each of the fifth and the sixth LEDs and each of the first and the fourth terminals, and such that the fifth LED and the sixth LED are coupled between the first terminal and the fourth terminal in an opposing polarity manner.

13. The scanner of claim 12 wherein said control logic causes at least two pairs of LEDs to be turned on concurrently, one pair at a time.

14. The scanner of claim 12, wherein the plurality of LEDs further comprises a seventh LED coupled to the first terminal and the second terminal.

15. The scanner of claim 12, wherein the first LED and the second LED are coupled between the second terminal and the third terminal in an opposing polarity manner in that an anode of the first LED and a cathode of the second LED are coupled to the second terminal and a cathode of the first LED and an anode of the second LED are coupled to the third terminal.

16. The scanner of claim 15, wherein the third LED and the fourth LED are coupled between the third terminal and the fourth terminal in an opposing polarity manner in that a cathode of the third LED and an anode of the fourth LED are coupled to the third terminal and an anode of the third LED and a cathode of the fourth LED are coupled to the fourth terminal.

17. The scanner of claim 16, wherein the fifth LED and the sixth LED are coupled between the first terminal and the fourth terminal in an opposing polarity manner in that a cathode of the fifth LED and an anode of the sixth LED are coupled to the first terminal and an anode of the fifth LED and a cathode of the sixth LED are coupled to the fourth terminal.

* * * * *